United States Patent
Wang

(10) Patent No.: US 10,932,116 B2
(45) Date of Patent: Feb. 23, 2021

(54) WIRELESS FIDELITY NETWORK SCANNING METHOD AND MOBILE DEVICE

(71) Applicant: Huawei Technologies Co., Ltd., Shenzhen (CN)

(72) Inventor: Tongbo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/314,056

(22) PCT Filed: Jun. 30, 2016

(86) PCT No.: PCT/CN2016/087976
§ 371 (c)(1),
(2) Date: Dec. 28, 2018

(87) PCT Pub. No.: WO2018/000358
PCT Pub. Date: Jan. 4, 2018

(65) Prior Publication Data
US 2019/0208399 A1    Jul. 4, 2019

(51) Int. Cl.
*H04W 8/00*      (2009.01)
*H04W 52/02*     (2009.01)
*H04W 48/16*     (2009.01)
*H04W 84/12*     (2009.01)
*H04W 76/10*     (2018.01)
(Continued)

(52) U.S. Cl.
CPC ......... *H04W 8/005* (2013.01); *H04W 48/16* (2013.01); *H04W 52/0254* (2013.01); *H04W 76/10* (2018.02); *H04W 84/12* (2013.01); *H04W 88/08* (2013.01); *Y02D 30/70* (2020.08)

(58) Field of Classification Search
None
See application file for complete search history.

(56) References Cited

U.S. PATENT DOCUMENTS 8,634,349 B1    1/2014  Shmidt
10,433,103 B2   10/2019 Nagaraj
(Continued)

FOREIGN PATENT DOCUMENTS

CN    102316555 A    1/2012
CN    102714885 A    10/2012
(Continued)

*Primary Examiner* — Sai Aung
*Assistant Examiner* — Liem H. Nguyen
(74) *Attorney, Agent, or Firm* — Slater Matsil, LLP

(57) ABSTRACT

A Wireless Fidelity network scanning method and a mobile device are provided. The method includes: obtaining, by a mobile device, information about a distance between a location of the mobile device at a first time point and a location of the mobile device at a second time point, where the first time point is a time point later than the second time point; determining, by the mobile device, that the information about the distance is less than a first distance threshold, and adjusting a first scanning frequency at which the mobile device scans a WiFi network to a second scanning frequency, where the second scanning frequency is less than the first scanning frequency; and scanning, by the mobile device, the WiFi network according to the second scanning frequency.

17 Claims, 6 Drawing Sheets

(51) Int. Cl.
*H04W 88/08* (2009.01)
*H04W 64/00* (2009.01)
*H04W 88/06* (2009.01)

(56) References Cited

U.S. PATENT DOCUMENTS

| | | | |
|---|---|---|---|
| 2008/0045210 A1* | 2/2008 | Kaaja | H04W 52/0219 455/434 |
| 2010/0103844 A1 | 4/2010 | Kim | |
| 2010/0157864 A1* | 6/2010 | Salomone | H04W 48/16 370/311 |
| 2013/0210425 A1 | 8/2013 | Nagaraj | |
| 2013/0250861 A1* | 9/2013 | Luetschwager | H04W 76/10 370/328 |
| 2014/0105086 A1 | 4/2014 | Chhabra et al. | |
| 2015/0065054 A1 | 3/2015 | Jung et al. | |
| 2015/0226573 A1* | 8/2015 | Poduri | G01C 21/14 702/160 |
| 2016/0278039 A1* | 9/2016 | Persson | G01S 5/0294 |
| 2017/0332292 A1* | 11/2017 | Ponnuswamy | H04L 43/16 |
| 2018/0039315 A1 | 2/2018 | Pham et al. | |
| 2018/0220261 A1* | 8/2018 | Nagaraj | H04W 52/0229 |

FOREIGN PATENT DOCUMENTS

| | | | |
|---|---|---|---|
| CN | 103347292 A | | 10/2013 |
| CN | 103415066 A | | 11/2013 |
| CN | 103458440 A | | 12/2013 |
| CN | 103957503 A | | 7/2014 |
| CN | 204117159 U | | 1/2015 |
| CN | 204434005 U | | 7/2015 |
| CN | 105264456 A | | 1/2016 |
| CN | 105898705 A | * | 8/2016 |
| JP | 2015511466 A | | 4/2015 |
| KR | 20090087300 A | | 8/2009 |
| KR | 20140112558 A | | 9/2014 |

* cited by examiner

Scanning time interval 10s    Scanning duration 3s

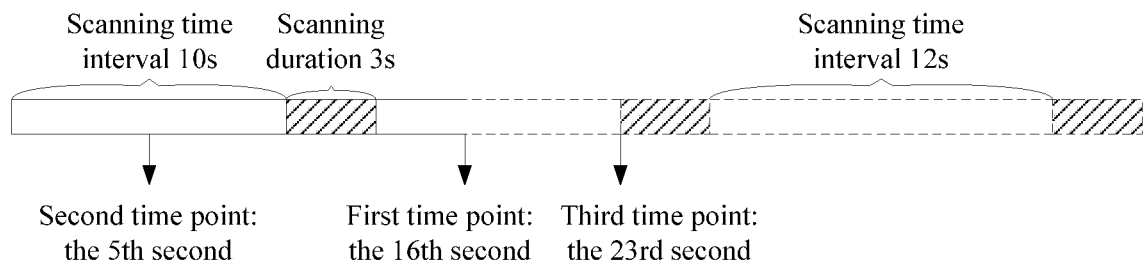
FIG. 4
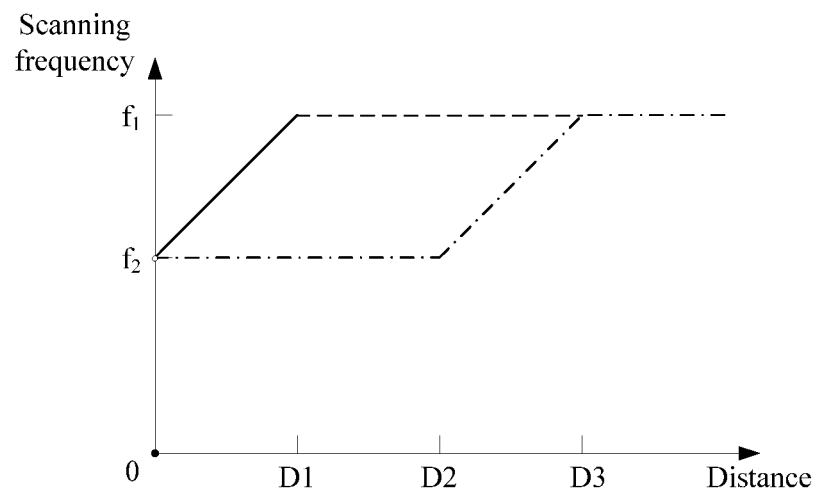
FIG. 5
FIG. 6

WIRELESS FIDELITY NETWORK SCANNING METHOD AND MOBILE DEVICE

CROSS-REFERENCE TO RELATED APPLICATIONS

This application is a national stage of International Application No. PCT/CN2016/087976, filed on Jun. 30, 2016, which is hereby incorporated by reference in its entirety.

TECHNICAL FIELD

The present invention relates to the field of communications technologies, and in particular, to a Wireless Fidelity network scanning method and a mobile device.

BACKGROUND

Since the wireless local area network standard IEEE 802.11 was published in 1997, greatly driven by the WiFi Alliance that includes many industry-leading companies, the Wireless Fidelity (Wireless Fidelity, WiFi) technology has developed rapidly based on its advantages such as fast deployment, convenient usage, and a high transmission rate. At present, the WiFi technology is widely applied to various industries. Access points (Access Point, AP) of a WiFi network are distributed all over places such as hotels, coffee shops, schools, and hospitals. WiFi is ubiquitous in life.

As more mobile devices support the WiFi technology, such as notebook computers, tablet computers, and mobile phones, the WiFi network is used more frequently. To achieve better user experience, an existing WiFi device discovers an access hotspot with a better signal strength by using an active scanning mechanism, so as to obtain better network communication quality. Generally, in different states, the WiFi device scans WiFi access points at different time intervals. For example, if a screen is on and no AP is connected, a WiFi scanning time interval of a smartphone is 10 s (second), that is, the smartphone scans the WiFi network every 10 s, and scanning duration is approximately 3 s each time. If a screen is on and unlocked and no AP is connected, a WiFi scanning time interval of a smartphone is 32 s.

Periodic WiFi scanning consumes a quantity of electricity of a mobile device, affecting battery durance of the mobile device. Therefore, how to reduce unnecessary active scanning without affecting user experience is of great significance to reducing WiFi power consumption. In the prior art, power consumption of scanning the WiFi network by the mobile device is relatively high.

SUMMARY

An objective of the present invention is to provide a Wireless Fidelity network scanning method and a mobile device, so as to resolve a prior-art problem of relatively high power consumption of scanning a WiFi network by a mobile device.

To achieve the foregoing objective, the following technical solutions are used in the present invention:

According to a first aspect, a Wireless Fidelity network scanning method is provided, including: obtaining, by a mobile device, information about a distance between a location of the mobile device at a first time point and a location of the mobile device at a second time point, where the first time point is a time point later than the second time point; determining, by the mobile device, that the information about the distance is less than a first distance threshold, and adjusting a first scanning frequency at which the mobile device scans a WiFi network to a second scanning frequency, where the second scanning frequency is less than the first scanning frequency; and scanning, by the mobile device, the WiFi network according to the second scanning frequency.

According to the technical solution provided in the first aspect, in specific duration, if a distance of a location change of the mobile device is less than a distance threshold, a scanning frequency at which the mobile device scans the WiFi network is reduced. That is, if a location change of the mobile device is relatively small in specific duration, a time interval at which the mobile device actively scans the WiFi network may be increased, so as to reduce consumption of a quantity of electricity of the mobile device and reduce power consumption.

With reference to the first aspect, in a first possible implementation of the first aspect, the scanning, by the mobile device, the WiFi network according to the second scanning frequency includes: starting, by the mobile device, scanning the WiFi network at the first time point, and starting scanning the WiFi network according to the second scanning frequency at a scanning end time point. That is, after adjusting the first scanning frequency to the second scanning frequency, the mobile device immediately scans the WiFi network once, and starts scanning the WiFi network according to the second scanning frequency at an end time point of current scanning, so that the mobile device can access a better AP as quickly as possible, thereby ensuring that performance of accessing the WiFi network by the mobile device is not affected.

With reference to the first aspect, in a second possible implementation of the first aspect, the scanning, by the mobile device, the WiFi network according to the second scanning frequency includes: starting, by the mobile device, scanning the WiFi network according to the first scanning frequency at a third time point, where the third time point is a time point later than the first time point; and starting, by the mobile device, scanning the WiFi network according to the second scanning frequency when WiFi network scanning at the third time point ends. That is, after adjusting the first scanning frequency to the second scanning frequency, the mobile device waits for a next time point at which the mobile device scans, according to the first scanning frequency, the WiFi network; and starts scanning the WiFi network according to the second scanning frequency when WiFi network scanning at the next time point ends, so as to save a quantity of electricity of the mobile device and reduce power consumption.

With reference to the first aspect, in a third possible implementation of the first aspect, the method further includes: determining, by the mobile device, that the information about the distance is greater than a second distance threshold, and adjusting the first scanning frequency at which the mobile device scans the WiFi network to a third scanning frequency, where the third scanning frequency is greater than the first scanning frequency; and scanning, by the mobile device, the WiFi network according to the third scanning frequency. According to the foregoing possible implementation, in specific duration, if a distance of a location change of the mobile device is greater than a distance threshold, a scanning frequency at which the mobile device scans the WiFi network is increased. In this way, after reducing a scanning frequency, if a location change of the mobile device is relatively large, the mobile device may adjust a scanning frequency of the mobile device back to an initial scanning frequency, thereby ensuring that performance of accessing the WiFi network by the mobile device is not affected.

With reference to the third possible implementation of the first aspect, in a fourth possible implementation of the first aspect, before the adjusting a first scanning frequency at which the mobile device scans a WiFi network to a third scanning frequency, the method includes: determining, by the mobile device, that the first scanning frequency is not greater than an upper frequency limit. It should be noted that the upper frequency limit is not greater than an existing frequency at which the mobile device scans the WiFi network, thereby ensuring that power consumption of the mobile device can be reduced according to embodiments of the present invention.

With reference to the first aspect or any one of the foregoing possible implementations of the first aspect, in a fifth possible implementation of the first aspect, the method further includes: scanning, by the mobile device, the WiFi network at the second time point, to obtain information about a first access point; and scanning, by the mobile device, the WiFi network at the first time point, to obtain information about a second access point; and the obtaining, by a mobile device, information about a distance between a location of the mobile device at a first time point and a location of the mobile device at a second time point includes: determining, by the mobile device, space loss information of electromagnetic wave transmission according to the information about the first access point and the information about the second access point; and determining, by the mobile device according to the space loss information, the information about the distance between the location of the mobile device at the first time point and the location at the second time point. In the foregoing possible implementation, the mobile device may obtain a forward or backward movement distance of the mobile device by calculation according to related information that is about a WiFi access point and that is obtained by forward or backward scanning. That is, no other additional component is required for calculating, by the mobile device, the information about the distance, thereby avoiding additional power consumption.

With reference to the first aspect or any one of the foregoing possible implementations of the first aspect, in a sixth possible implementation of the first aspect, the obtaining, by a mobile device, information about a distance between a location of the mobile device at a first time point and a location of the mobile device at a second time point includes: calculating, by the mobile device, a quantity of movement steps according to a pedometer algorithm; and determining, by the mobile device according to the quantity of movement steps and step length information, the information about the distance between the location of the mobile device at the first time point and the location at the second time point. That is, the mobile device may calculate the information about the distance of the mobile device by using a pedometer with low power consumption. The step length information may be set by a user. Alternatively, the mobile device may count, by using the Global Positioning System GPS and the pedometer, a quantity of steps taken by a user within a distance, and obtain the step length information by dividing the distance by the quantity of steps.

With reference to the first aspect or any one of the foregoing possible implementations of the first aspect, in a seventh possible implementation of the first aspect, the obtaining, by a mobile device, information about a distance between a location of the mobile device at a first time point and a location of the mobile device at a second time point includes: determining, by the mobile device according to a pedestrian dead reckoning PDR or voyage data recorder VDR algorithm, the information about the distance between the location of the mobile device at the first time point and the location at the second time point. Both the PDR algorithm and the VDR algorithm are algorithms for recording a movement track of the mobile device. The mobile device may calculate the information about the distance of the mobile device by using the PDR algorithm or the VDR algorithm that is with low power consumption.

With reference to the first aspect or any one of the foregoing possible implementations of the first aspect, in an eighth possible implementation of the first aspect, the obtaining, by a mobile device, information about a distance between a location of the mobile device at a first time point and a location of the mobile device at a second time point includes: determining, by the mobile device according to a Global Positioning System GPS algorithm, the information about the distance between the location of the mobile device at the first time point and the location at the second time point.

In the first aspect or some possible implementations of the first aspect, before obtaining the information about the distance, the mobile device may further determine whether the location of the mobile device at the first time point changes relative to the location of the mobile device at the second time point. If the location of the mobile device does not change, the mobile device may stop scanning the WiFi network, thereby further saving a quantity of electricity and reducing power consumption.

According to a second aspect, a mobile device is provided, including: an obtaining unit, configured to obtain information about a distance between a location of the mobile device at a first time point and a location of the mobile device at a second time point, where the first time point is a time point later than the second time point; a determining unit, configured to determine that the information about the distance is less than a first distance threshold; an adjustment unit, configured to adjust a first scanning frequency at which the mobile device scans a WiFi network to a second scanning frequency, where the second scanning frequency is less than the first scanning frequency; and a scanning unit, configured to scan the WiFi network according to the second scanning frequency.

According to the mobile device provided in the second aspect, in specific duration, if a distance of a location change of the mobile device is less than a distance threshold, a scanning frequency at which the mobile device scans the WiFi network is reduced. That is, if a location change of the mobile device is relatively small in specific duration, a time interval at which the mobile device actively scans the WiFi network may be increased, so as to reduce consumption of a quantity of electricity of the mobile device and reduce power consumption.

With reference to the second aspect, in a first possible implementation of the second aspect, the scanning unit is configured to: start scanning the WiFi network at the first time point, and start scanning the WiFi network according to the second scanning frequency at a scanning end time point.

With reference to the second aspect, in a second possible implementation of the second aspect, the scanning unit is configured to: start scanning the WiFi network according to the first scanning frequency at a third time point, where the third time point is a time point later than the first time point;

and start scanning the WiFi network according to the second scanning frequency when WiFi network scanning at the third time point ends.

With reference to the second aspect, in a third possible implementation of the second aspect, the determining unit is further configured to determine that the information about the distance is greater than a second distance threshold; the adjustment unit is further configured to adjust the first scanning frequency at which the mobile device scans the WiFi network to a third scanning frequency, where the third scanning frequency is greater than the first scanning frequency; and the scanning unit is further configured to scan the WiFi network according to the third scanning frequency.

With reference to the third possible implementation of the second aspect, in a fourth possible implementation of the second aspect, the determining unit is further configured to: before the adjustment unit adjusts the first scanning frequency at which the mobile device scans the WiFi network to the third scanning frequency, determine that the first scanning frequency is not greater than an upper frequency limit.

With reference to the second aspect or any one of the foregoing possible implementations of the second aspect, in a fifth possible implementation of the second aspect, the scanning unit is further configured to: scan the WiFi network at the second time point, to obtain information about a first access point; and scan the WiFi network at the first time point, to obtain information about a second access point; and the obtaining unit is configured to: determine space loss information of electromagnetic wave transmission according to the information about the first access point and the information about the second access point; and determine, according to the space loss information, the information about the distance between the location of the mobile device at the first time point and the location at the second time point.

With reference to the second aspect or any one of the foregoing possible implementations of the second aspect, in a sixth possible implementation of the second aspect, the obtaining unit is configured to: calculate a quantity of movement steps according to a pedometer algorithm; and determine, according to the quantity of movement steps and step length information, the information about the distance between the location of the mobile device at the first time point and the location at the second time point.

With reference to the second aspect or any one of the foregoing possible implementations of the second aspect, in a seventh possible implementation of the second aspect, the obtaining unit is configured to: determine, according to a pedestrian dead reckoning PDR or voyage data recorder VDR algorithm, the information about the distance between the location of the mobile device at the first time point and the location at the second time point.

With reference to the second aspect or any one of the foregoing possible implementations of the second aspect, in an eighth possible implementation of the second aspect, the obtaining unit is configured to: determine, according to a Global Positioning System GPS algorithm, the information about the distance between the location of the mobile device at the first time point and the location at the second time point.

According to a third aspect, another mobile device is provided, including: a processor, a WiFi antenna, and a communications bus, where the processor and the WiFi antenna communicate with each other by using the communications bus, and the processor is configured to perform the following operations: obtaining information about a distance between a location of the mobile device at a first time point and a location of the mobile device at a second time point, where the first time point is a time point later than the second time point; determining that the information about the distance is less than a first distance threshold, and adjusting a first scanning frequency at which the mobile device scans a WiFi network to a second scanning frequency, where the second scanning frequency is less than the first scanning frequency; and controlling, according to the second scanning frequency, the WiFi antenna to scan the WiFi network.

With reference to the third aspect, in some possible implementations of the third aspect, the processor is further configured to execute the method in any one of the possible implementations of the first aspect.

According to a fourth aspect, a computer readable medium is provided, configured to store a computer program. The computer program includes an instruction used to execute the method in the first aspect or any one of the possible implementations of the first aspect.

BRIEF DESCRIPTION OF THE DRAWINGS

FIG. 4 is a schematic diagram of another timeline of scanning a WiFi network according to an embodiment of the present invention;

FIG. 5 is a schematic diagram of still another timeline of scanning a WiFi network according to an embodiment of the present invention;

FIG. 6 is a schematic diagram of a mapping relationship between a distance of a location change of a mobile device and a scanning frequency according to an embodiment of the present invention;

DETAILED DESCRIPTION OF ILLUSTRATIVE EMBODIMENTS

To make a person skilled in the art more easily understand improvements made on the prior art by technical solutions provided in embodiments of the present invention, the following first briefly introduces the prior art.

At present, when a WiFi function is enabled on a mobile device, such as a smartphone, to achieve better user experience, a background of the mobile device obtains information about a surrounding hotspot by means of periodic scanning. As described in the following Table 1, a period of active WiFi scanning of the mobile device is fixed. In addition, scanning periods in different scenarios are slightly different.

TABLE 1

| Test setting | WiFi scanning test result of the mobile device | | | |
|---|---|---|---|---|
| Test status | Home screen on | Setting screen on | Home screen off, and then on and unlocked | Setting screen off, and then on and unlocked |
| No AP connected and no list stored | Regular scanning, with scanning performed once at 30 seconds and then performed every 32 seconds | Regular scanning, performed every 10 seconds | Regular scanning, performed every 32 seconds | Regular scanning, performed every 10 seconds |
| AP connected and no list stored | Regular scanning, with scanning performed once at 30 seconds and then performed every 32 seconds | Regular scanning, performed every 10 seconds | Regular scanning, performed every 32 seconds | Regular scanning, performed every 10 seconds |
| AP connected and list stored | No scanning | Regular scanning, performed every 10 seconds | No scanning | Regular scanning, performed every 10 seconds |

Figure 1:
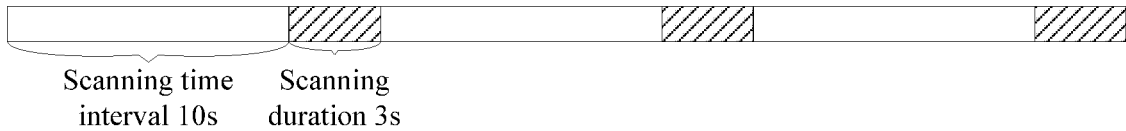
FIG. 1 is a schematic diagram of a timeline of scanning a WiFi network by a mobile device according to a fixed scanning frequency in the prior art.

Using an example in which the setting screen is on for description, FIG. 1 shows a timeline of scanning WiFi by the smartphone when the setting screen is on. As shown in the figure, when the WiFi function is enabled and no AP is connected, the smartphone scans WiFi every 10 s, that is, a scanning period is 10 s. Scanning duration is 3 s each time. In a WiFi scanning manner shown in FIG. 1, power consumption of the smartphone in scanning is approximately 220 mA (milliampere) each time.

It can be learned from the foregoing Table 1 that, in the prior art, the WiFi scanning period of the mobile device is not adjusted with reference to movement status information of a user, causing a disadvantage that if a location change of the mobile device is relatively small or the mobile device is still, active scanning performed on a WiFi network by the mobile device is meaningless, wasting a quantity of electricity.

The embodiments of the present invention provide a Wireless Fidelity network scanning method and a mobile device, to adjust a WiFi scanning period according to a location change of a mobile device, thereby resolving a prior-art problem of relatively high power consumption of scanning a WiFi network by a mobile device.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions provided in the following embodiments of the present invention may be applied to a mobile device with a WiFi scanning function, for example, a portable mobile device such as a smartphone, a smart watch, or a tablet computer.

Figure 2:
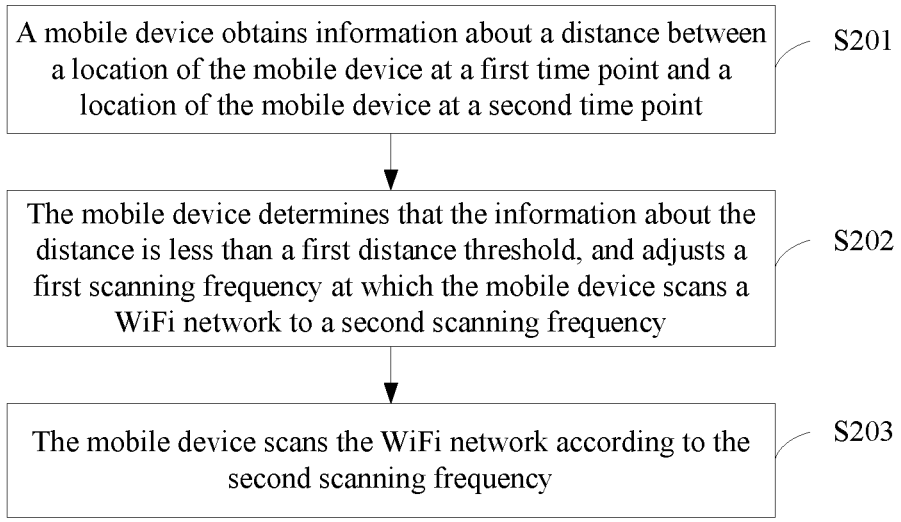
FIG. 2 is a schematic flowchart of a Wireless Fidelity network scanning method according to an embodiment of the present invention.

An embodiment of the present invention provides a Wireless Fidelity network scanning method. The method is applied to a mobile device. As shown in FIG. 2, the method includes the following steps.

S201. A mobile device obtains information about a distance between a location of the mobile device at a first time point and a location of the mobile device at a second time point.

The first time point is a time point later than the second time point.

S202. The mobile device determines that the information about the distance is less than a first distance threshold, and adjusts a first scanning frequency at which the mobile device scans a WiFi network to a second scanning frequency.

The second scanning frequency is less than the first scanning frequency.

S203. The mobile device scans the WiFi network according to the second scanning frequency.

According to the foregoing solution, in specific duration, if a distance of a location change of the mobile device is less than the first distance threshold, a scanning frequency of the mobile device is reduced. That is, if a location change of the mobile device is relatively small in specific duration, a time interval at which the mobile device actively scans the WiFi network may be increased, so as to reduce consumption of a quantity of electricity of the mobile device and reduce power consumption.

To make a person skilled in the art better understand the technical solution provided in this embodiment of the present invention, the following describes the foregoing steps in detail.

In a possible implementation of this embodiment of the present invention, the mobile device may obtain, according to a fixed period, information about a distance of a location change of the mobile device in each period, and adjust a WiFi scanning frequency of the mobile device according to the information about the distance in each period.

In the foregoing possible implementation, duration between the first time point and the second time point in step S201 is duration of the fixed period.

The duration of the fixed period may be preset according to an actual requirement. The first distance threshold may also be preset according to an actual requirement.

It should be noted that the foregoing is merely a possible implementation. In a specific implementation, the mobile device may also obtain the information about the distance of the location change according to another rule. For example, when determining that the GPS (Global Positioning System, Global Positioning System) is enabled, the mobile device obtains the information about the distance of the location change of the mobile device within 1 minute after the GPS is enabled. This is not limited in the present invention.

Further, the foregoing step S203 may be implemented in the following two manners.

Manner 1: The mobile device starts scanning the WiFi network at the first time point, and starts scanning the WiFi network according to the second scanning frequency at a scanning end time point.

That is, after adjusting the first scanning frequency to the second scanning frequency, the mobile device immediately scans the WiFi network once, and starts scanning the WiFi network according to the second scanning frequency at an end time point of current scanning.

Figure 3:
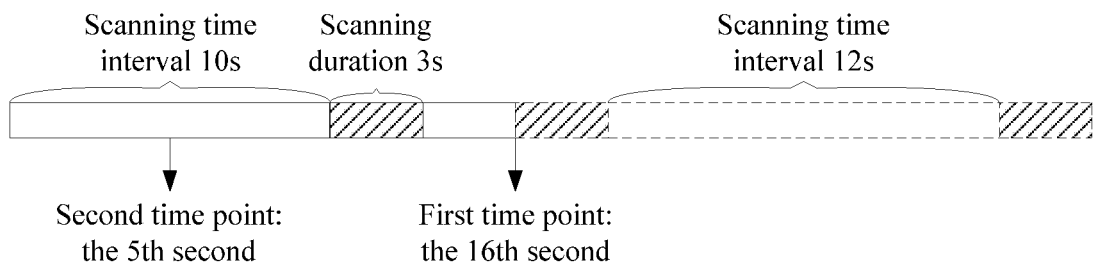
FIG. 3 is a schematic diagram of a timeline of scanning a WiFi network according to an embodiment of the present invention.

For example, FIG. 3 is a schematic diagram of a timeline of scanning the WiFi network and obtaining the information about the distance of the location change by the mobile device in the foregoing manner 1. As shown in the figure, the first scanning frequency of the mobile device is scanning the WiFi network every 10 s, scanning duration is 3 s, the second time point is the 5th second, and the first time point is the 16th second. In this way, when determining that a distance of a location change of the mobile device between the 5th second and the 16th second is less than the preset first distance threshold, the mobile device adjusts the first scanning frequency to the second scanning frequency. As shown in the figure, the second scanning frequency is scanning the WiFi network every 12 s. In addition, the mobile device immediately starts scanning the WiFi network at the 16th second, stops scanning after continuous scanning of 3 s, and scans the WiFi network again after an interval of 12 s, that is, the mobile device starts scanning the WiFi network according to the second scanning frequency at the 19th second.

Manner 2: The mobile device starts scanning the WiFi network according to the first scanning frequency at a third time point, where the third time point is a time point later than the first time point; and starts scanning the WiFi network according to the second scanning frequency when WiFi network scanning at the third time point ends.

That is, after adjusting the first scanning frequency to the second scanning frequency, the mobile device waits for a next time point at which the mobile device scans, according to the first scanning frequency, the WiFi network; and starts scanning the WiFi network according to the second scanning frequency when WiFi network scanning at the next time point ends.

For example, FIG. 4 is a schematic diagram of a timeline of scanning the WiFi network and obtaining the information about the distance of the location change by the mobile device in the foregoing manner 2. As shown in the figure, the first scanning frequency of the mobile device is scanning the WiFi network every 10 s, scanning duration is 3 s, the second time point is the 5th second, and the first time point is the 16th second. In this way, when determining that a distance of a location change of the mobile device between the 5th second and the 16th second is less than the preset first distance threshold, the mobile device adjusts the first scanning frequency to the second scanning frequency. As shown in the figure, the second scanning frequency is scanning the WiFi network every 12 s. However, a scanning frequency of the mobile device at the first time point is still 10 s, and the second scanning frequency takes effect only after a next time of scanning performed by the mobile device ends. As shown in the figure, after adjusting the first scanning frequency to the second scanning frequency, the mobile device scans the WiFi network once from the 23rd second to the 26th second, and the mobile device starts scanning the WiFi network according to the second scanning frequency at the 26th second.

It should be noted that FIG. 4 and FIG. 5 are merely examples for description. In a specific implementation, the mobile device may obtain information about a distance of a location change of the mobile device between any two time points. For example, the mobile device may obtain information about a distance of a location change of the mobile device within 1 minute after a WiFi scanning function is enabled, or may obtain, according to a fixed period, a distance of a location change in each period, or may make a period in which the mobile device obtains information about a distance of a location change consistent with a period in which the mobile device scans the WiFi network. This is not limited in the present invention. In addition, in the foregoing manner 2, if the mobile device obtains, according to a preset fixed period, information about a distance of a location change in each period, the fixed period and scanning interval duration of the mobile device may meet the following condition: Duration of the fixed period is greater than (2×a first scanning time interval+a second scanning time interval+3×scanning duration)/2.

As shown in FIG. 5, the first scanning time interval is 8 s, the scanning duration is 3 s, the second scanning time interval is 10 s, and the duration of the fixed period is 20 s, thereby ensuring that the mobile device adjusts a scanning frequency next time after the mobile device scans, according to the second scanning frequency, the WiFi network at least once.

Before step S201, the mobile device may further determine whether the location of the mobile device at the first time point changes relative to the location of the mobile device at the second time point. If the location of the mobile device does not change, the mobile device may stop scanning the WiFi network, thereby further saving a quantity of electricity. If the location of the mobile device changes, the foregoing steps S201 to S203 are further performed.

Further, after step S103, if a distance that is obtained by the mobile device next time and that is of a location change of the mobile device in a specific period of time is greater than a second distance threshold, the second scanning frequency may be adjusted to the first scanning frequency.

For example, a first distance threshold D1 and a second distance threshold D2 are set, where D2 is greater than D1. When the distance of the location change of the mobile device between the first time point and the second time point is less than D1, the mobile device reduces the first scanning frequency for scanning the WiFi network to the second scanning frequency, so as to reduce a quantity of electricity of the mobile device. Further, in a subsequent period of time, if a distance of a location change of the mobile device is greater than D1 and less than D2, the mobile device may retain the second scanning frequency; if a distance of a location change is greater than D2, the mobile device may increase the second scanning frequency to the first scanning frequency, so as to ensure that performance of accessing the WiFi network by the mobile device is not affected.

The foregoing is merely an example for description. In a specific implementation, a variable relationship between a distance of a location change of the mobile device and a scanning frequency may be further preset. Each time the mobile device obtains information about a distance of a location change, the mobile device may determine scanning frequency adjustment according to the variable relationship.

For example, FIG. 6 is a schematic diagram of a variable relationship between a distance of a location change of the mobile device and a scanning frequency. A first scanning frequency at which the mobile device initially scans the WiFi network is $f_1$. When a distance D of a location change of the mobile device is 0, a scanning frequency of the mobile device is 0, that is, the mobile device stops scanning. When a distance D of a location change of the mobile device is in a range of 0 to D1, a scanning frequency of the mobile device is reduced. As shown by a solid line in FIG. 6, a reduced scanning frequency of the mobile device is $f=(f_1-f_2)$ D/D1+$f_2$. When a distance D of a location change of the mobile device is greater than D1, as shown by a dashed line in FIG. 6, the mobile device retains the first scanning frequency $f_1$. When a distance D of a location change of the mobile device is greater than D2, because a WiFi scanning frequency of the mobile device has reached an upper limit, the WiFi scanning frequency cannot be increased any more, and $f_1$ is retained. If a first scanning frequency at which the mobile device initially scans the WiFi network is $f_2$, that is, a lower limit of a scanning frequency, as shown by a dash-dotted line in FIG. 6, when a distance D of a location change of the mobile device is greater than D1 and less than D2, the mobile device retains the first scanning frequency $f_2$. When a distance D of a location change of the mobile device is greater than D2 and less than D3, a scanning frequency of the mobile device increases linearly with the distance D, until the scanning frequency of the mobile device increases to the first scanning frequency $f_1$. That is, the first scanning frequency $f_1$ is an upper threshold of a frequency at which the mobile device scans the WiFi network. The first scanning frequency $f_1$ is less than or equal to a frequency of scanning a WiFi network by a mobile device in the prior art, thereby ensuring that power consumption of a mobile device can be reduced according to the embodiments of the present invention.

The following describes the Wireless Fidelity network scanning method provided in this embodiment of the present invention with reference to a specific application scenario.

Figure 7:
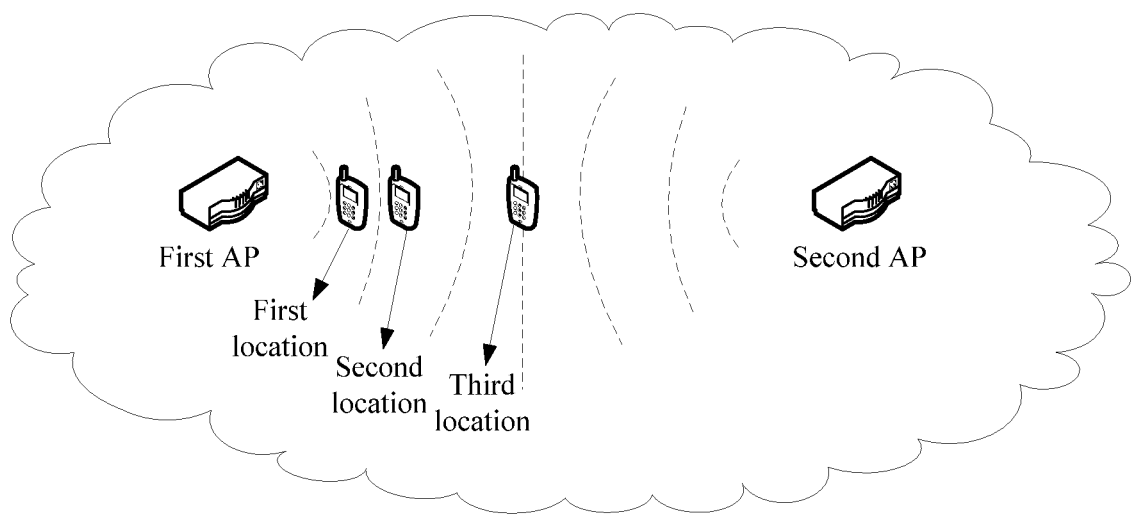
FIG. 7 is a schematic diagram of an application scenario of a Wireless Fidelity network scanning method according to an embodiment of the present invention.

As shown in FIG. 7, there are two WiFi hotspots in an area, such as a first AP and a second AP that are shown in FIG. 7. An initial status of a smartphone is that the smartphone is at a first location and has accessed the first AP. When a setting screen is on, the smartphone scans a WiFi network every 10 s. In this case, the smartphone obtains, according to a fixed period, a distance of a location change of the mobile device in each period. If a location of the smartphone does not change, it should be noted that no matter whether the smartphone moves in a period, provided that a location of the smartphone is still the first location when the period ends, it may be determined that the location of the mobile device does not change. In this case, because the mobile device has accessed the first AP, the smartphone still accesses the first AP when the smartphone scans the WiFi network again. Therefore, continuing scanning the WiFi network wastes a quantity of electricity of the smartphone. Therefore, the smartphone may stop scanning.

If the smartphone determines, in a period, that the smartphone moves from the first location to a second location, in this case, because the smartphone has accessed the first AP and a signal strength of the first AP is not significantly weakened, the smartphone may stop scanning to save a quantity of electricity; or may reduce a scanning frequency, for example, adjust the scanning frequency to scanning the WiFi network every 12 s, so as to save a quantity of electricity and ensure that the smartphone can discover an AP with a higher signal strength.

Further, if the smartphone determines, in a period, that the smartphone moves from the second location to a third location, because the smartphone is located between the first AP and the second AP, to ensure that the smartphone can quickly select an optimal access point from the first AP and the second AP, in this case, the smartphone is restored to scanning the WiFi network every 10 s. As shown in FIG. 7, a distance between the first location and the second location is less than a distance between the second location and the third location. In addition, with reference to FIG. 6, when the distance between the first location and the second location is less than D1 and the smartphone determines, in a period, that the smartphone moves from the first location to the second location, the smartphone adjusts scanning the WiFi network every 10 s to scanning the WiFi network every 12 s. When the distance between the second location and the third location is greater than D2 and the smartphone determines, in a period, that the smartphone moves from the second location to the third location, the smartphone may adjust scanning the WiFi network every 12 s back to scanning the WiFi network every 10 s. Certainly, the smartphone may also retain a frequency of scanning the WiFi network every 12 seconds.

FIG. 7 is merely an example for description. In a specific implementation, a rule for adjusting a scanning frequency by a mobile device according to a distance of a location change may be set according to an actual requirement. This is not limited in the present invention.

In addition, it should be noted that the mobile device may determine a status by using a smart sensor sensor with low power consumption. For example, the mobile device may determine, by using an activity recognition (AR Activity Recognition, AR) algorithm, whether the mobile device is currently in a moving state or a still state, and may further count a quantity of steps by using a pedometer algorithm, or record a movement track by using a pedestrian dead reckoning (Pedestrian Dead Reckoning, PDR) algorithm, so as to further obtain information about a distance of a location change of the mobile device.

Specifically, in the foregoing step 201, the mobile device may obtain the information about the distance in the following four manners.

Manner 1: The mobile device scans the WiFi network at the second time point, to obtain information about a first access point. The mobile device scans the WiFi network at the first time point, to obtain information about a second access point. The mobile device determines space loss information of electromagnetic wave transmission according to the information about the first access point and the information about the second access point. The mobile device determines, according to the space loss information, the information about the distance between the location of the mobile device at the first time point and the location at the second time point.

For example, the mobile device includes an SSID (Service Set Identifier, service set identifier) list. The SSID list records SSIDs, operating frequency bands, MAC (Media Access Control, Media Access Control) addresses, and corresponding RSSIs (Received Signal Strength Indication, received signal strength indication) that are obtained by the mobile device by scanning at different time points, as described in the following Table 2.

TABLE 2

| No. | SSID | Operating frequency band | AP MAC address | RSSI_t0 | RSSI_t1 | RSSI_ti (i = 2, ..., N) |
|---|---|---|---|---|---|---|
| 1 | NETGEAR_2g | 2.4G | 78:6a:89:a1:a1:29 | RSSI_t0 | RSSI_t1 | RSSI_ti |
| 2 | TP Link354 | 2.4G | 78:6a:89:a1:a1:30 | RSSI_t0 | RSSI_t1 | RSSI_ti |
| 3 | TP LinkXXX_2g | 2.4G | 58:2A:F7:59:56:2B | RSSI_t0 | RSSI_t1 | RSSI_ti |
| 4 | ... | 2.4G | 58:1F:28:D1:50:7F | RSSI_t0 | RSSI_t1 | RSSI_ti |
| 5 | ... | 2.4G | 84:1B:5E:29:A0:E8 | RSSI_t0 | RSSI_t1 | RSSI_ti |
| 6 | ... |  | F4:8E:92:D0:99:1C | RSSI_t0 | RSSI_t1 | RSSI_ti |
| 7 | ... |  | 0E:96:BF:E7:68:C8 | RSSI_t0 | RSSI_t1 | RSSI_ti |
| 8 | ... |  | ... |  |  |  |
| 9 | NETGEAR_5g | 5G | 78:6a:89:a1:a1:29 | RSSI_t0 | RSSI_t1 | RSSI_ti |
| 10 | ... |  | 78:6a:89:a1:a1:30 | RSSI_t0 | RSSI_t1 | RSSI_ti |
| 11 | ... |  | 58:2A:F7:59:56:2B | RSSI_t0 | RSSI_t1 | RSSI_ti |
| 12 | ... |  | 58:1F:28:D1:50:7F | RSSI_t0 | RSSI_t1 | RSSI_ti |
| 13 | ... |  | 84:1B:5E:29:A0:E8 | RSSI_t0 | RSSI_t1 | RSSI_ti |
| 14 | ... |  | F4:8E:92:D0:99:1C | RSSI_t0 | RSSI_t1 | RSSI_ti |
| 15 | ... |  | ... | RSSI_t0 | RSSI_t1 | RSSI_ti |

RSSI_t0 is signal strength information that is of an AP MAC address and that is obtained by the mobile device by scanning at a t0 time point. RSSI_t1 is signal strength information that is of an AP MAC address and that is obtained by the mobile device by scanning at a t1 time point. RSSI_ti is signal strength information that is of an AP MAC address and that is obtained by the mobile device by scanning at a ti time point.

Further, after the mobile device completes scanning at the ti time point, a hotspot list and related information that are currently obtained by scanning are recorded, and may be compared with a hotspot and related information that are obtained by scanning at a previous time point, so as to determine a location variation of the mobile device. Specifically, the location variation of the mobile device is mainly obtained by calculation according to a variation of an RSSI that is corresponding to an SSID and that is obtained by scanning. For example, if signal strengths of an SSID in two consecutive times of scanning are RSSI_ti and RSSI_ti+1, a location variation, that is, the information about the distance, may be calculated according to the following space loss formula of electromagnetic wave transmission:

$FL(dB)=32.45+20\times lgf(MHz)+20\times lgD(km)$, where

FL is a transmission loss, is equal to an absolute value of a difference between RSSI_ti and RSSI_ti+1, and is a known value; f is an operating frequency of the SSID and is a known value. In this way, a distance value D may be obtained by substituting the foregoing two known values into the foregoing formula for calculation.

Because an RSSI in space has particular uncertainty, in a possible implementation of this embodiment of the present invention, the mobile device may perform comprehensive comparison and calculation with reference to variations that are of multiple SSIDs in the list and that are obtained by scanning, so as to improve accuracy of a location variation.

Manner 2: The mobile device calculates a quantity of movement steps according to the pedometer algorithm. The mobile device determines, according to the quantity of movement steps and step length information, the information about the distance between the location of the mobile device at the first time point and the location at the second time point.

Preferably, the mobile device may select a pedometer with low power consumption to calculate the quantity of movement steps. The information about the distance may be obtained by multiplying the quantity of movement steps by a step length.

The step length information may be preset in the mobile device by a user according to an actual condition. Alternatively, the mobile device may locate a distance by using the GPS and count a quantity of movement steps in the distance. The step length information may be obtained by dividing the distance by the quantity of movement steps.

Manner 3: The mobile device determines, according to the pedestrian dead reckoning PDR algorithm or a voyage data recorder (Voyage Data Recorder, VDR) algorithm, the information about the distance between the location of the mobile device at the first time point and the location at the second time point.

Specifically, the mobile device determines a movement distance of the mobile device by using the PDR or VDR algorithm with low power consumption.

Manner 4: The mobile device determines, according to a GPS algorithm, the information about the distance between the location of the mobile device at the first time point and the location at the second time point.

The GPS algorithm has a ranging function. Therefore, when the mobile device has enabled the GPS, the mobile device may determine, by using the GPS algorithm, the information about the distance between the location at the first time point and the location at the second time point.

It should be noted that power consumption of the mobile device increases if a GPS function is enabled merely for adjusting a WiFi scanning frequency of the mobile device. Therefore, in a specific implementation of this embodiment of the present invention, when the GPS is enabled, the mobile device may trigger adjustment of the WiFi scanning frequency of the mobile device. That is, when a user enables the GPS of the mobile device because of another requirement, such as navigation or map querying, a GPS module in the mobile device triggers a WiFi scanning module in the mobile device to adjust a scanning frequency.

Figure 8:
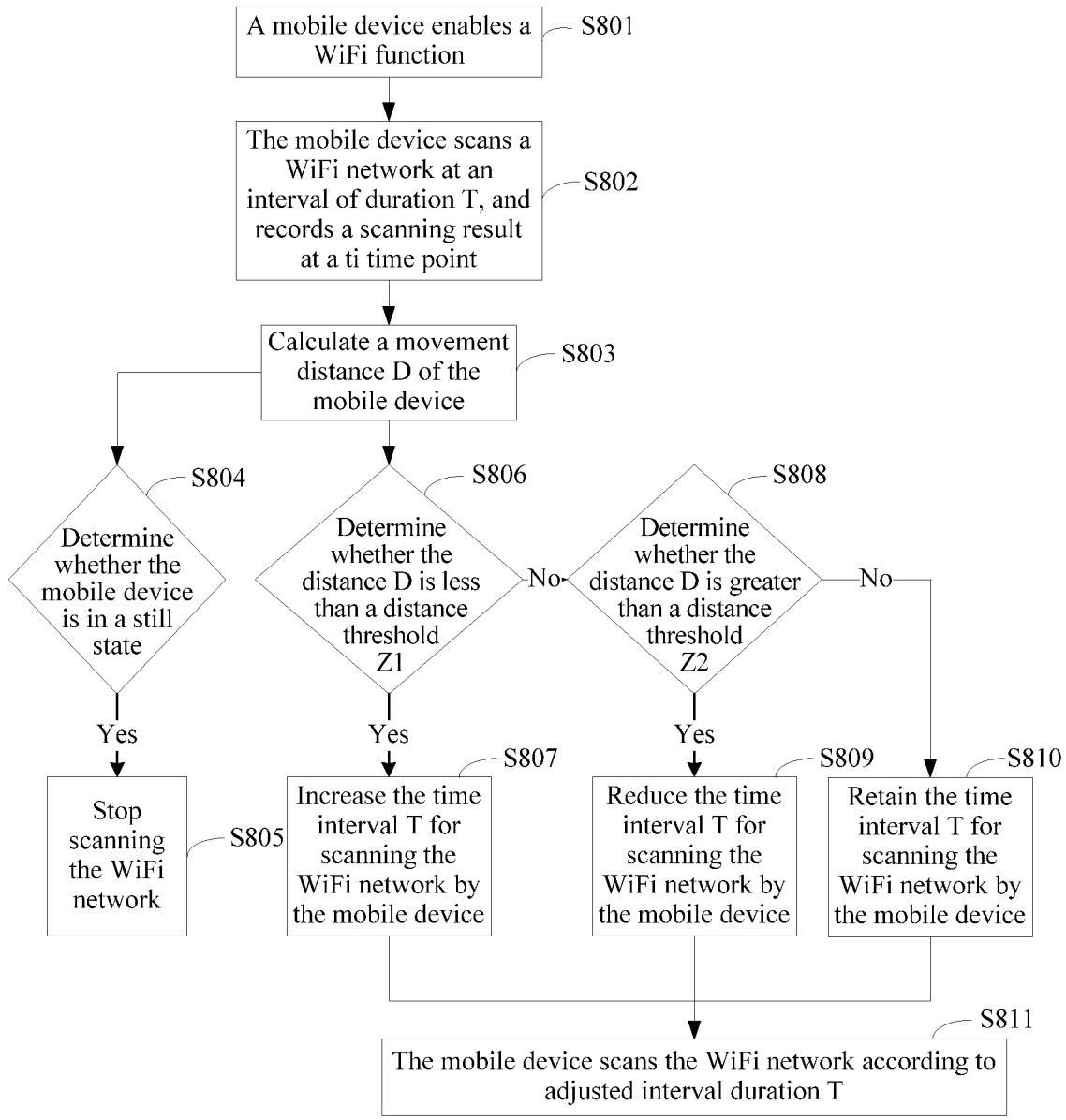
FIG. 8 is a schematic flowchart of another Wireless Fidelity network scanning method according to an embodiment of the present invention.

To make a person skilled in the art better understand the technical solutions provided in the embodiments of the present invention, the following describes, in detail by using an example, a process of a Wireless Fidelity network scanning method provided in an embodiment of the present invention. As shown in FIG. 8, the method includes the following steps.

S801. A mobile device enables a WiFi function.

For example, the mobile device is a smartphone. Each time the smartphone is powered on, the WiFi function is automatically enabled at a background of the smartphone.

S802. The mobile device scans a WiFi network at an interval of duration T, and records a scanning result at a ti time point.

Specifically, referring to the foregoing descriptions of Table 2, the mobile device may record SSIDs, operating frequency bands, MAC addresses, and corresponding RSSIs that are obtained by scanning at different time points. Details are not described herein.

S803. The mobile device calculates a movement distance D of the mobile device.

Specifically, for step S803, refer to the foregoing descriptions of Manner 1 to Manner 4 for obtaining the information about the distance by the mobile device. Details are not described herein.

S804. The mobile device determines whether the mobile device is in a still state.

Specifically, if the movement distance D of the mobile device is 0 or is less than a preset threshold, it may be determined that the mobile device is in the still state.

Further, if the mobile device is in the still state, step S805 is performed; if the mobile device is not in the still state, step S806 is performed.

S805. The mobile device stops scanning the WiFi network.

S806. The mobile device determines whether the distance D is less than a distance threshold Z1.

If the distance D is less than the distance threshold Z1, step S807 is performed; if the distance D is not less than the distance threshold Z1, step S808 is performed. The distance threshold Z1 may be preset.

S807. The mobile device increases the time interval T for scanning the WiFi network.

Further, step S811 is performed.

That is, when a location of the mobile device does not change obviously, the WiFi scanning time interval of the mobile device may be increased, that is, a WiFi scanning frequency may be reduced, so as to reduce power consumption.

S808. The mobile device determines whether the distance D is greater than a distance threshold Z2.

If the distance D is greater than the distance threshold Z2, step S809 is performed; if the distance D is not greater than the distance threshold Z2, step S810 is performed. The distance threshold Z2 may be preset.

S809. The mobile device reduces the time interval T for scanning the WiFi network.

Further, step S811 is performed.

That is, when a location of the mobile device changes obviously, the WiFi scanning time interval of the mobile device may be reduced, that is, a WiFi scanning frequency may be increased, so as to ensure that the mobile device can access an optimal WiFi hotspot and avoid affecting user experience.

S810. The mobile device retains the time interval T for scanning the WiFi network.

That is, when the movement distance D of the mobile device is between the distance threshold Z1 and the distance threshold Z2, it indicates that a location change of the mobile device is not large, the current WiFi scanning time interval may be retained.

Further, step S811 is performed.

S811. The mobile device scans the WiFi network according to adjusted interval duration T.

By using the foregoing method, the mobile device may adjust the WiFi network scanning time interval according to the movement distance, so that scanning the WiFi network by the mobile device becomes more flexible. In addition, when the mobile device is in the still state or the movement distance is relatively small, the mobile device may increase the scanning time interval, that is, reduce the scanning frequency, thereby saving a quantity of electricity of the mobile device and achieving a technical effect of reducing power consumption of the device.

It should be noted that the steps shown in FIG. 2 are merely examples for description. For simple description, the steps are all described as a series of action combinations. However, a person skilled in the art should know that the present invention is not limited to the described sequence of actions. For example, the mobile device may also first determine whether the distance D is greater than the distance threshold Z2 and then determine whether the distance D is less than the distance threshold Z1. In addition, a person skilled in the art should also know that the embodiments described in the specification all belong to preferred embodiments, and related actions are not necessarily mandatory to the embodiments of the present invention. For example, the mobile device may skip performing steps S804 and S805.

Figure 9:
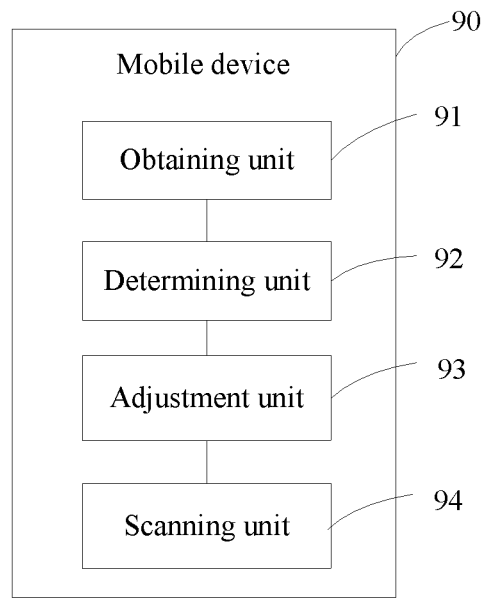
FIG. 9 is a schematic structural diagram of a mobile device according to an embodiment of the present invention.

An embodiment of the present invention further provides a mobile device 90. The mobile device 90 is configured to implement the Wireless Fidelity network scanning method provided in the foregoing method embodiment. As shown in FIG. 9, the mobile device 90 includes:

an obtaining unit 91, configured to obtain information about a distance between a location of the mobile device at a first time point and a location of the mobile device at a second time point, where the first time point is a time point later than the second time point;

a determining unit 92, configured to determine that the information about the distance is less than a first distance threshold;

an adjustment unit 93, configured to adjust a first scanning frequency at which the mobile device scans a WiFi network to a second scanning frequency, where the second scanning frequency is less than the first scanning frequency; and a scanning unit 94, configured to scan the WiFi network according to the second scanning frequency.

According to the foregoing mobile device, in specific duration, if a distance of a location change of the mobile device is less than a distance threshold, a scanning frequency at which the mobile device scans the WiFi network is reduced. That is, if a location change of the mobile device is relatively small in specific duration, a time interval at which the mobile device actively scans the WiFi network may be increased, so as to reduce consumption of a quantity of electricity of the mobile device and reduce power consumption.

The scanning unit 94 may scan the WiFi network according to the second scanning frequency in the following two manners.

Manner 1: The scanning unit 94 is configured to: start scanning the WiFi network at the first time point, and start scanning the WiFi network according to the second scanning frequency at a scanning end time point.

That is, after adjusting the first scanning frequency to the second scanning frequency, the mobile device immediately scans the WiFi network once, and starts scanning the WiFi network according to the second scanning frequency at an end time point of current scanning, so that the mobile device can access a better AP as quickly as possible, thereby ensuring that performance of accessing the WiFi network by the mobile device is not affected. For details, refer to the descriptions of FIG. 3 in the foregoing method embodiment. Details are not described herein.

Manner 2: The scanning unit 94 is configured to: start scanning the WiFi network according to the first scanning frequency at a third time point, where the third time point is a time point later than the first time point; and start scanning the WiFi network according to the second scanning frequency when WiFi network scanning at the third time point ends.

That is, after adjusting the first scanning frequency to the second scanning frequency, the mobile device waits for a next time point at which the mobile device scans, according to the first scanning frequency, the WiFi network; and starts scanning the WiFi network according to the second scanning frequency when WiFi network scanning at the next time point ends, so as to save a quantity of electricity of the mobile device and reduce power consumption. For details, refer to the descriptions of FIG. 4 in the foregoing method embodiment. Details are not described herein.

In a possible implementation of this embodiment of the present invention, the determining unit 92 is further configured to determine that the information about the distance is greater than a second distance threshold; the adjustment unit 93 is further configured to adjust the first scanning frequency at which the mobile device scans the WiFi network to a third scanning frequency, where the third scanning frequency is greater than the first scanning frequency; and the scanning unit 94 is further configured to scan the WiFi network according to the third scanning frequency. In this way, after reducing a scanning frequency, if a location change of the mobile device is relatively large, the mobile device may adjust a scanning frequency of the mobile device back to an initial scanning frequency, thereby ensuring that performance of accessing the WiFi network by the mobile device is not affected.

The determining unit 92 may be further configured to: before the adjustment unit 93 adjusts the first scanning frequency at which the mobile device scans the WiFi network to the third scanning frequency, determine that the first scanning frequency is not greater than an upper frequency limit. It should be noted that the upper frequency limit is not greater than an existing frequency at which the mobile device scans the WiFi network, thereby ensuring that power consumption of the mobile device can be reduced according to this embodiment of the present invention.

The obtaining unit 91 may obtain the information about the distance in the following four manners.

Manner 1: The scanning unit 94 is further configured to: scan the WiFi network at the second time point, to obtain information about a first access point; and scan the WiFi network at the first time point, to obtain information about a second access point. The obtaining unit 91 is configured to: determine space loss information of electromagnetic wave transmission according to the information about the first access point and the information about the second access point; and determine, according to the space loss information, the information about the distance between the location of the mobile device at the first time point and the location at the second time point. In this way, the mobile device may obtain a forward or backward movement distance of the mobile device by calculation according to related information that is about a WiFi access point and that is obtained by forward or backward scanning. That is, no other additional component is required for calculating, by the mobile device, the information about the distance, thereby avoiding additional power consumption.

Manner 2: The obtaining unit 91 is configured to: calculate a quantity of movement steps according to a pedometer algorithm; and determine, according to the quantity of movement steps and step length information, the information about the distance between the location of the mobile device at the first time point and the location at the second time point. That is, the mobile device may calculate the information about the distance of the mobile device by using a pedometer with low power consumption. The step length information may be set by a user. Alternatively, the mobile device may count, by using the Global Positioning System GPS and the pedometer, a quantity of steps taken by a user within a distance, and obtain the step length information by dividing the distance by the quantity of steps.

Manner 3: The obtaining unit 91 is configured to determine, according to a pedestrian dead reckoning PDR or voyage data recorder VDR algorithm, the information about the distance between the location of the mobile device at the first time point and the location at the second time point. Both the PDR algorithm and the VDR algorithm are algorithms for recording a movement track of the mobile device. The mobile device may calculate the information about the distance of the mobile device by using the PDR algorithm or the VDR algorithm that is with low power consumption.

Manner 4: The obtaining unit 91 is configured to determine, according to a Global Positioning System GPS algorithm, the information about the distance between the location of the mobile device at the first time point and the location at the second time point.

It should be noted that, the foregoing unit division of the mobile device 90 is merely logical function division and may be other division in an actual implementation. For example, the determining unit 92 and the adjustment unit 93 may be grouped into one processing unit. In addition, there may be multiple physical implementations of the foregoing functional units. For example, the determining unit 92 may be specifically a central processor, or may be an application-specific integrated circuit (Application Specific Integrated Circuit, ASIC); the obtaining unit 91 may be a chip integrated with at least one of the pedometer algorithm, the PDR algorithm, or the VDR algorithm. This is not limited in the present invention.

In addition, a person skilled in the art should clearly understand that, for the purpose of convenient and brief description, for a detailed working process of the foregoing units of the mobile device, reference may be made to the corresponding process in the foregoing method embodiment, and details are not described herein.

An embodiment of the present invention further provides another mobile device 10, configured to implement the Wireless Fidelity network scanning method provided in the foregoing method embodiment. The mobile device 10 includes a processor 101, a WiFi antenna 102, and a communications bus 103. The processor 101 and the WiFi antenna 102 communicate with each other by using the communications bus 103.

The processor 101 is configured to perform the following operations:

obtaining information about a distance between a location of the mobile device at a first time point and a location of the mobile device at a second time point, where the first time point is a time point later than the second time point;

determining that the information about the distance is less than a first distance threshold, and adjusting a first scanning frequency at which the mobile device scans a WiFi network to a second scanning frequency, where the second scanning frequency is less than the first scanning frequency; and controlling, according to the second scanning frequency, the WiFi antenna to scan the WiFi network.

Optionally, the scanning the WiFi network according to the second scanning frequency includes:

starting scanning the WiFi network at the first time point, and starting scanning the WiFi network according to the second scanning frequency at a scanning end time point.

Optionally, the scanning the WiFi network according to the second scanning frequency includes:

starting scanning the WiFi network according to the first scanning frequency at a third time point, where the third time point is a time point later than the first time point; and starting scanning the WiFi network according to the second scanning frequency when WiFi network scanning at the third time point ends.

Optionally, the operations further include:

determining that the information about the distance is greater than a second distance threshold, and adjusting the first scanning frequency at which the mobile device scans the WiFi network to a third scanning frequency, where the third scanning frequency is greater than the first scanning frequency; and scanning the WiFi network according to the third scanning frequency.

Optionally, before the adjusting the first scanning frequency at which the mobile device scans the WiFi network to a third scanning frequency, the operations include: determining that the first scanning frequency is not greater than an upper frequency limit.

Optionally, the operations further include:

scanning the WiFi network at the second time point, to obtain information about a first access point; and scanning the WiFi network at the first time point, to obtain information about a second access point; and the obtaining information about a distance between a location of the mobile device at a first time point and a location of the mobile device at a second time point includes: determining space loss information of electromagnetic wave transmission according to the information about the first access point and the information about the second access point; and determining, according to the space loss information, the information about the distance between the location of the mobile device at the first time point and the location at the second time point.

Optionally, the obtaining information about a distance between a location of the mobile device at a first time point and a location of the mobile device at a second time point includes: calculating a quantity of movement steps according to a pedometer algorithm; and determining, according to the quantity of movement steps and step length information, the information about the distance between the location of the mobile device at the first time point and the location at the second time point.

Optionally, the obtaining information about a distance between a location of the mobile device at a first time point and a location of the mobile device at a second time point includes: determining, according to a pedestrian dead reckoning PDR or voyage data recorder VDR algorithm, the information about the distance between the location of the mobile device at the first time point and the location at the second time point.

Optionally, the obtaining information about a distance between a location of the mobile device at a first time point and a location of the mobile device at a second time point includes: determining, by using a Global Positioning System GPS algorithm, the information about the distance between the location of the mobile device at the first time point and the location at the second time point.

Figure 10:
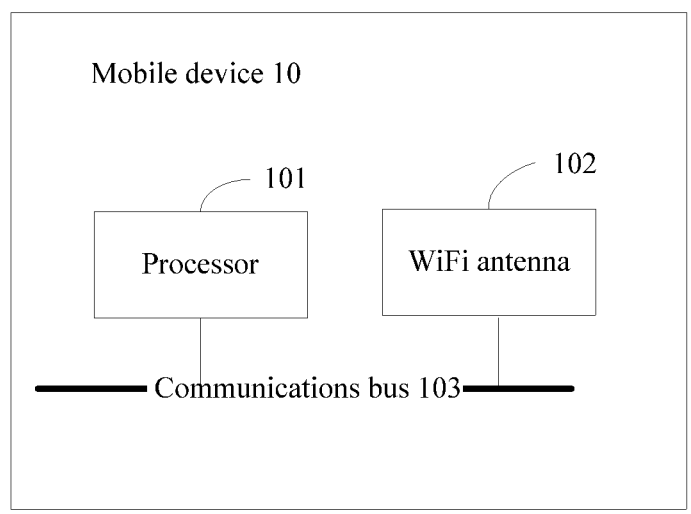
FIG. 10 is a schematic structural diagram of another mobile device according to an embodiment of the present invention.

The mobile device 10 may further include other components, such as a storage medium, configured to store an instruction. The processor 101 invokes the instruction to perform the foregoing operations. FIG. 10 does not show the components one by one. In addition, a person skilled in the art should understand that the operations performed by the processor 101 may be completed under cooperation with the other components. For convenient description, a collective description is made in this embodiment of the present invention that the processor 101 performs the Wireless Fidelity network scanning operations.

In addition, the processor 101 in this embodiment of the present invention may be a central processing unit (Center Processing Unit, CPU). Alternatively, to save a computing resource of a CPU, the processor 101 may be a field programmable gate array (Field Programmable Gate Array, FPGA), to implement all the Wireless Fidelity network scanning operations in this embodiment of the present invention. Alternatively, the processor 101 may be a CPU and an FPGA. The FPGA and the CPU separately perform some of the Wireless Fidelity network scanning operations in this embodiment of the present invention. For convenient description, a collective description is made in this embodiment of the present invention that the processor 101 implements the Wireless Fidelity network scanning operations in this embodiment of the present invention. For details, refer to corresponding descriptions in the foregoing method embodiment. Details are not described herein.

FIG. 9 and FIG. 10 are schematic structural diagrams of a mobile terminal according to an embodiment of the present invention. The mobile terminal provided in this embodiment of the present invention may be configured to implement the method implemented in the embodiments of the present invention in FIG. 1 to FIG. 8. For convenient description, merely parts related to this embodiment of the present invention are shown. For specific technical details that are not disclosed, refer to the embodiments of the present invention in FIG. 1 to FIG. 8.

Figure 11:
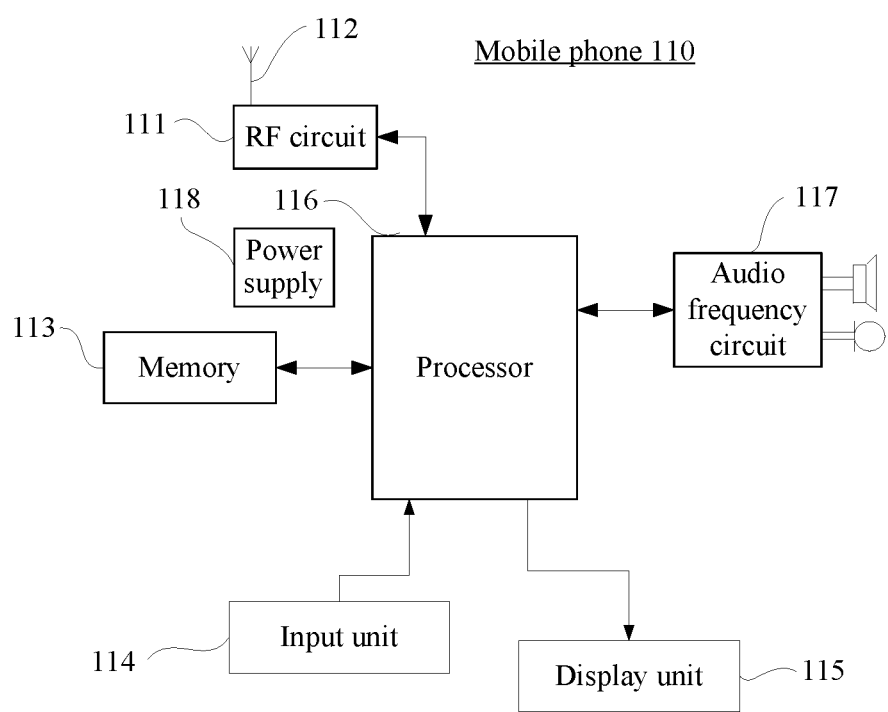
FIG. 11 is a schematic structural diagram of a mobile phone according to an embodiment of the present invention.

The mobile terminal may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant). The following uses an example in which the mobile terminal is a mobile phone for description. FIG. 11 is a block diagram of a partial structure of a mobile phone 110 that is related to the embodiments of the present invention.

As shown in FIG. 11, the mobile phone 110 includes components such as an RF (radio frequency, radio frequency) circuit 111, a WiFi antenna 112, a memory 113, an input unit 114, a display unit 115, a processor 116, an audio frequency circuit 117, and a power supply 118. A person skilled in the art may understand that, the mobile phone structure shown in FIG. 11 does not constitute a limitation on the mobile phone. The mobile phone may include more or fewer components than those shown in the figure, or may combine some components, or may have a different component layout.

The following specifically introduces the composition components of the mobile phone 110 with reference to FIG. 11.

The WiFi antenna 112 is configured to scan a WiFi access point in a surrounding environment of the mobile phone 110, to obtain related information, so that the mobile phone 110 access the WiFi access point according to the related information.

The RF circuit 111 is configured to receive/transmit information, or receive or send a signal in a call process, and particularly, receive downlink information of a base station and send the downlink information to the processor 116 for processing. In addition, the RF circuit 111 sends uplink data to the base station. In this embodiment of the present invention, the RF circuit 111 is connected to the WiFi antenna and controls WiFi network scanning performed by the WiFi antenna. Generally, the RF circuit 111 includes but is not limited to an antenna, at least one amplifier, a transceiver, a coupler, a low noise amplifier (low noise amplifier, LNA), a duplexer, and the like. In addition, the RF circuit 111 may further communicate with a network and another device by means of wireless communication.

The memory 113 is configured to store a software program of the mobile phone 110. Generally, the memory 113 may include a high-speed random access memory, or may include a nonvolatile memory, for example, at least one disk storage component, a flash memory component, or another volatile solid-state storage component.

The processor 116 is a control center of the mobile phone 110, connects various components of the entire mobile phone by using various interfaces and lines, and executes various functions and data processing of the mobile phone 110 by running or executing the software program stored in the memory 113 and invoking data stored in the memory 113.

In this embodiment of the present invention, by executing the software program in the memory 113, the processor 116 may implement the Wireless Fidelity network scanning method provided in the foregoing method embodiment. For details, refer to the descriptions in the foregoing method embodiment. Details are not described herein.

The processor 116 may include one or more processing units. Preferably, the processor 116 may integrate an application processor and a modem processor. The application processor mainly processes an operating system, a user screen, an application program, and the like. The modem processor mainly processes wireless communication. It may be understood that the modem processor may not be integrated in the processor 116.

The input unit 114 may be configured to receive inputted numerical or character information, and generate a key signal input that is related to a user setting and function control of the mobile phone 110. Specifically, the input unit 114 may include a touchscreen and another input device. The touchscreen is also referred to as a touch panel, and is capable of collecting a touch operation of a user on or near the touchscreen, and drive a corresponding connected apparatus according to a preset program. The another input device may include but is not limited to one or more of a physical keyboard, a function key (such as a volume control key or a power on/off key), a track ball, a mouse, or a joystick.

The display unit 115 may be configured to display information inputted by a user or information provided for a user and various menus of the mobile phone 110. The display unit 115 may include a display panel. Optionally, the display panel may be configured in a form of a liquid crystal display (Liquid Crystal Display, LCD), an organic light-emitting diode (Organic Light-Emitting Diode, OLED), or the like.

The audio frequency circuit 117 is connected to a speaker and a microphone, and may provide an audio interface between a user and the mobile phone 110. The audio frequency circuit 117 may transmit, to the speaker, an electrical signal that is converted from received audio data. The speaker converts the electrical signal into an acoustical signal and outputs the acoustical signal. In another aspect, the microphone converts a collected acoustical signal into an electrical signal. The audio frequency circuit receives the electrical signal, converts the electrical signal into audio data, and outputs the audio data to the RF circuit 111, so as to send the audio data to, for example, another mobile phone, or outputs the audio data to the memory 113 for further processing.

The mobile phone 110 further includes the power supply 118 (such as a battery) that supplies power to each component. Preferably, the power supply may be logically connected to the processor 116 by using a power supply management system, so as to implement, by using the power supply management system, functions such as charging and discharging management and power consumption management.

Although not shown, the mobile phone 50 may further include a WiFi (wireless fidelity, Wireless Fidelity) module, a Bluetooth module, a sensor, and the like. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store data, such as a USB flash drive, a removable hard disk, a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    connecting, by a mobile device, to a first Wireless Fidelity (Wi-Fi) access point;
    performing, by the mobile device, Wi-Fi network scanning at a first scanning frequency $f_1$;
    determining, by the mobile device, a value of a distance D between a first location and a second location;
    in response to determining that the value of the distance D is less than a first preset distance threshold D1, when the mobile device displays an interface of Wi-Fi setting, when the mobile device is connected to the first Wi-Fi access point, and when the first scanning frequency $f_1$ is higher than a lower frequency limit, performing, by the mobile device, Wi-Fi network scanning at a second scanning frequency f, wherein the second scanning frequency f is less than the first scanning frequency $f_1$, and the second scanning frequency f is determined according to the relation $f=(f_1-f_2)D/D1+f_2$, wherein $f_2$ is the lower frequency limit; and
    in response to determining that the value of the distance D is greater than a preset second distance threshold, when the first scanning frequency $f_1$ is lower than a higher frequency limit, and when the mobile device displays the interface of Wi-Fi setting, performing, by the mobile device, Wi-Fi network scanning at a third scanning frequency, wherein the third scanning frequency is greater than the first scanning frequency $f_1$.

2. The method according to claim 1, further comprising:
    in response to determining that the value of the distance D is greater than the first preset distance threshold D1 and the value of the distance D is less than the second preset distance threshold, performing, by the mobile device, Wi-Fi network scanning at the first scanning frequency $f_1$.

3. The method according to claim 1, wherein after performing by the mobile device, Wi-Fi network scanning at the third scanning frequency, the method further comprises:
    disconnecting, by the mobile device, from the first Wi-Fi access point; and
    connecting, by the mobile device, to a second Wi-Fi access point.

4. The method according to claim 1, wherein determining the value of the distance D between the first location and the second location comprises:
    obtaining a first received signal strength indication (RSSI) at the first location;
    obtaining a second RSSI at the second location;
    determining, by the mobile device, space loss information of electromagnetic wave transmission according to the first RSSI and the second RSSI; and
    determining, by the mobile device according to the space loss information, the value of the distance D between the first location and the second location.

5. The method according to claim 1, wherein determining the value of the distance D between the first location and the second location comprises:
    calculating, by the mobile device, a quantity of movement steps according to a pedometer algorithm; and
    determining, by the mobile device according to the quantity of movement steps and step length information, the value of the distance D between the first location and the second location.

6. The method according to claim 1, wherein determining the value of the distance D between the first location and the second location comprises:
    determining, by the mobile device according to a pedestrian dead reckoning (PDR) or voyage data recorder (VDR) algorithm, the value of the distance D between the first location and the second location.

7. The method according to claim 1, wherein determining the value of the distance D between the first location and the second location comprises:
    determining, by the mobile device according to a Global Positioning System (GPS) algorithm, the value of the distance D between the first location and the second location.

8. An apparatus, applied in a mobile device, wherein the apparatus comprises:
    at least one processor;
    wherein the processor is configured to:
        control the mobile device to connect to a first Wireless Fidelity (Wi-Fi) access point;
        control the mobile device to perform Wi-Fi network scanning at a first scanning frequency $f_1$;
        determine a value of a distance D between a first location and a second location;
        in response to determining the value of the distance D is less than a first preset distance threshold D1, when the mobile device displays an interface of Wi-Fi setting, when the mobile device is connected to the first Wi-Fi access point, and when the first scanning frequency $f_1$ is higher than a lower frequency limit, control the mobile device to perform Wi-Fi network scanning at a second scanning frequency f, wherein the second scanning frequency f is less than the first scanning frequency $f_1$, and the second scanning frequency f is determined according to the relation $f=(f_1-f_2)D/D1+f_2$, and wherein $f_2$ is the lower frequency limit; and
        in response to determining that the value of the distance D is greater than a second preset distance threshold, when the first scanning frequency $f_1$ is lower than a higher frequency limit, and when the mobile device displays the interface of Wi-Fi setting, control the mobile device to perform Wi-Fi network scanning at a third scanning frequency, wherein the third scanning frequency is greater than the first scanning frequency $f_1$.

9. The apparatus according to claim 8, wherein the at least one processor is further configured to:
    in response to determining that the value of the distance D is greater than the first preset distance threshold D1 and the value of the distance D is less than the second preset distance threshold, control the mobile device to perform Wi-Fi network scanning at the first scanning frequency $f_1$.

10. A mobile device, comprising:
    at least one processor;
    a non-transitory memory; and
    a communications bus, wherein the at least one processor and the memory are connected by using the communications bus;
    wherein the memory is configured to store instructions, and the at least one processor is configured to execute the instructions stored in the memory to:
        connect to a first Wireless Fidelity (Wi-Fi) access point;
        perform Wi-Fi network scanning at a first scanning frequency $f_1$;
        determine, by the mobile device, a value of a distance D between a first location and a second location;

in response to determining that the value of the distance D is less than a first preset distance threshold D1, and when the first scanning frequency $f_1$ is higher than a lower frequency limit, perform, by the mobile device, Wi-Fi network scanning at a second scanning frequency f, wherein the second scanning frequency f is less than the first scanning frequency $f_1$, and the second scanning frequency f is determined according to the relation $f=(f_1-f_2)D/D1+f_2$, and wherein $f_2$ is the lower frequency limit; and in response to determining that the value of the distance D is greater than a second preset distance threshold, and when the first scanning frequency $f_1$, is lower than a higher frequency limit, perform, by the mobile device, Wi-Fi network scanning at a third scanning frequency, wherein the third scanning frequency is greater than the first scanning frequency $f_1$.

11. The mobile device according to claim 10, wherein the at least one processor is configured to execute the instructions stored in the memory to:

in response to determining that the value of the distance D is less than the first preset distance threshold D1, and when the mobile device is connected to the first Wi-Fi access point, perform Wi-Fi network scanning at the second scanning frequency f.

12. The mobile device according to claim 10, wherein the at least one processor is configured to execute the instructions stored in the memory to:

in response to determining that the value of the distance D is greater than the first preset distance threshold D1 and the value of the distance D is less than the second preset distance threshold, perform Wi-Fi network scanning at the first scanning frequency $f_1$.

13. The mobile device according to claim 10, wherein the at least one processor is configured to further execute the instructions stored in the memory to:

after performing by the mobile device, Wi-Fi network scanning at the third scanning frequency:

disconnect from the first Wi-Fi access point; and
connect to a second Wi-Fi access point.

14. The mobile device according to claim 10, wherein the at least one processor is configured to execute the instructions stored in the memory to:

obtain a first received signal strength indication (RSSI) at the first location;

obtain a second RSSI at the second location;

determine space loss information of electromagnetic wave transmission according to the first RSSI and the second RSSI; and determine, according to the space loss information, the value of the distance D between the first location and the second location.

15. The mobile device according to claim 10, wherein the at least one processor is configured to execute the instructions stored in the memory to:

calculate a quantity of movement steps according to a pedometer algorithm; and determine, according to the quantity of movement steps and step length information, the value of the distance D between the first location and the second location.

16. The mobile device according to claim 10, wherein the at least one processor is configured to execute the instructions stored in the memory to:

determine, according to a pedestrian dead reckoning (PDR) or voyage data recorder (VDR) algorithm, the value of the distance D between the first location and the second location.

17. The mobile device according to claim 10, wherein the at least one processor is configured to execute the instructions stored in the memory to:

determine, according to a Global Positioning System (GPS) algorithm, the value of the distance D between the first location and the second location.

* * * * *

UNITED STATES PATENT AND TRADEMARK OFFICE
CERTIFICATE OF CORRECTION

PATENT NO. : 10,932,116 B2
APPLICATION NO. : 16/314056
DATED : February 23, 2021
INVENTOR(S) : Wang It is certified that error appears in the above-identified patent and that said Letters Patent is hereby corrected as shown below:

In the Claims

In Column 24, Line 45, Claim 8, delete "$f_i$" and insert --$f_1$--.

In Column 24, Line 53, Claim 9, delete "$f_i$" and insert --$f_1$--.

In Column 25, Line 17, Claim 10, delete "$f_i$" and insert --$f_1$--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*